United States Patent [19]

Akatsu

[11] Patent Number: 5,061,171
[45] Date of Patent: Oct. 29, 1991

[54] APPARATUS FOR PERFORMING FRICTION MATERIAL

[75] Inventor: Yozo Akatsu, Saitama, Japan

[73] Assignee: Akebono Brake Industry Co., Ltd., Tokyo, Japan

[21] Appl. No.: 510,245

[22] Filed: Apr. 19, 1990

[30] Foreign Application Priority Data

Apr. 28, 1989 [JP] Japan ................................ 1-107167

[51] Int. Cl.$^5$ ........................ B29C 43/04; B29C 31/04
[52] U.S. Cl. .................................... 425/356; 264/120;
425/253; 425/347; 425/421; 425/423; 425/431;
425/447
[58] Field of Search .............. 425/356, 414, 428, 431,
425/253, 255, 347, 348 R, 421, 423, 447;
264/109, 113, 120

[56] References Cited

U.S. PATENT DOCUMENTS

| | | | |
|---|---|---|---|
| 852,839 | 5/1907 | Howell | 425/428 |
| 1,318,882 | 10/1919 | Kipniss et al. | 425/356 |
| 2,517,001 | 8/1950 | Lewon et al. | 425/431 |
| 2,573,141 | 10/1951 | Heinrich | 264/109 |
| 3,621,092 | 11/1971 | Hofer | 264/120 |
| 3,998,573 | 12/1976 | Gilbert et al. | 425/117 |
| 4,108,935 | 8/1978 | Moneghan | 264/40.7 |
| 4,203,936 | 5/1980 | Kiwak et al. | 264/26 |
| 4,440,708 | 4/1984 | Haataja et al. | 264/122 |
| 4,790,966 | 12/1988 | Sandberg et al. | 264/113 |
| 4,887,410 | 12/1989 | Gandini | 425/356 |
| 4,923,661 | 5/1990 | Russo | 425/126.1 |
| 4,968,468 | 11/1990 | Leinweber | 264/120 |

Primary Examiner—Jay H. Woo
Assistant Examiner—Robert B. Davis
Attorney, Agent, or Firm—Finnegan, Henderson, Farabow, Garrett, and Dunner

[57] ABSTRACT

Apparatus for performing a friction material includes a friction material-charging device for charging an appropriate amount of a friction material into a cavity in an intermediate die member receiving a lower die member therein; a leveling device including a base having a plurality of narrow bars depending from the base, a first elevator mechanism for vertically moving the base, so that when the base is moved downward, the narrow bars are inserted into the cavity, and a device for imparting a horizontal reciprocal movement to the base when the base is moved downward, so as to level the friction material by the narrow bars; a recess-pressing device including a push rod, and a second elevator mechanism for vertically moving the push rod, so that when the push rod is moved downward, the push rod is inserted into the cavity in the intermediate die member so as to press the friction material into the recess; and a pressing device including a third elevator mechanism for vertically moving an upper die member, so that when the upper die member is moved downward, the upper die member is fitted in the cavity in the intermediate die member so as to press the friction material.

2 Claims, 4 Drawing Sheets

APPARATUS FOR PERFORMING FRICTION MATERIAL

BACKGROUND OF THE INVENTION

1. Field of the Invention

The present invention relates to an apparatus for preforming a friction material for a brake.

2. Related Art

Conventionally, the preforming of a friction material of the type described has been effected by a manual operation. More specifically, conventionally, a friction material is manually charged into an intermediate die member receiving a lower die member therein, and the friction material received in the intermediate die member in a heaped-up manner is generally leveled. Then, bars are pushed into the thus leveled friction material so as to force the friction material into recessed formed in the lower die member. Then, the lower and intermediate die members are connected integrally with each other, and are transferred to a pressing machine, and then the friction material is pressed by an upper die member fitted in the intermediate die member, so that the friction material is preformed into a predetermined shape.

However, since the operation of this conventional preforming method is manually carried out, the efficiency of the operation is not satisfactory. And besides, during the preforming operation, the operator must directly touch the friction material containing asbestos which is a harmful material. Thus, the operator is exposed to such bad environment.

SUMMARY OF THE INVENTION

It is therefore an object of this invention to provide an apparatus for preforming a friction material which overcomes the above deficiencies of the conventional apparatus. That is, an object of the invention is to provide an apparatus for preforming a friction material by which the preformed friction material can automatically be produced by the preforming apparatus, and the efficiency of the operation is greatly improved, without varying the quality of the preformed products.

It is another object of the invention to provide an apparatus for preforming a friction material by which the working environment is greatly improved.

The above and other objects can be achieved by a provision of an apparatus for preforming a friction material which, according to the present invention, has a preform die comprising a lower die member having a recess formed in an upper surface thereof, an intermediate die member having a cavity for receiving the lower die member therein, and an upper die member slidably engageable in the cavity in the intermediate die member, a friction material-charging device for charging an appropriate amount of a friction material into the cavity in the intermediate die member receiving the lower die member therein, a leveling device comprising a base having a plurality of narrow bars depending from the base, a first elevator means for vertically moving the base, so that when the base is moved downward, the narrow bars are inserted into the cavity in the intermediate die member, and a device for imparting a horizontal reciprocal movement to the base when the base is moved downward, so as to level the friction material by the narrow bars, a recess-pressing device comprising a push rod, and a second elevator means for vertically moving the push rod, so that when the push rod is moved downward, the push rod is inserted into the cavity in the intermediate die member so as to press the friction material into the recess, and a pressing device comprising a third elevator means for vertically moving the upper die member, so that when the upper die member is moved downward, the upper die member is fitted in the cavity in the intermediate die member so as to press the friction material.

The intermediate die member can have a plurality of cavities for receiving a plurality of lower die members, respectively.

In the friction material-charging device, an appropriate amount of the friction material is charged into the cavity in the intermediate die member, receiving the lower die member therein, in a heaped-up manner. The intermediate die member supplied with the friction material is transferred or moved to a position beneath the leveling device. Then, the first elevator means is driven to move the base downward so as to insert the plurality of narrow bars into the cavity in the intermediate die member, so that the narrow bars are extended into the heaped-up friction material. Then, the horizontal movement-imparting device is driven to impart a reciprocal horizontal movement to the base, so that the heaped-up friction material on the lower die member is raked by the plurality of narrow bars in right and left directions and is generally level or made flat. After this leveling operation is finished, the base is returned or moved upward by the first elevator means to the position where the narrow bars will not interfere with the intermediate die member. The intermediate die member is further transferred to a position beneath the recess-pressing device. Then, the second elevator means is driven to move the push rod downward and is pushed into the recess in the lower die member. As a result, part of the generally-leveled friction material is pressed or forced into the recess, and the recess is fully filled with the friction material. The friction material in the recess undergoes a suitable compressive force. After the friction material is pressed into the recess, the push rod is returned or moved upward to the position where the push rod will not interfere with the intermediate die member. Then, the intermediate die member is further transferred to a position beneath the pressing device. Then, the upper die member is moved downward by the third elevator means and is fitted into the cavity in the intermediate die member, so that the upper die member is moved downward in the cavity to press the friction material, thereby preforming the material into a predetermined shape.

DESCRIPTION OF THE PREFERRED EMBODIMENTS

Figure 1:
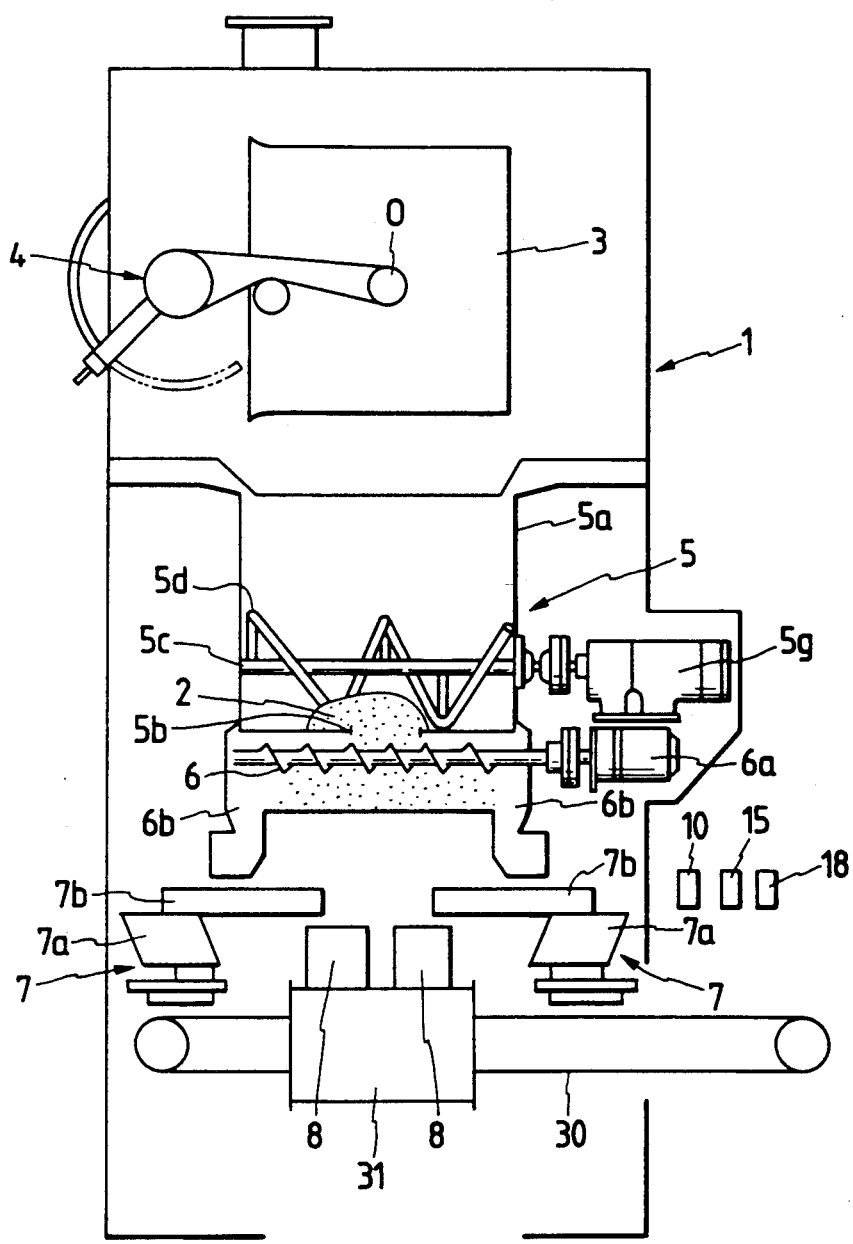
FIG. 1 is a schematic cross-sectional view of a preforming apparatus provided in accordance of the present invention.

The invention embodied in an apparatus for preforming a friction material for use in a disc brake will now be described with reference to the drawings.

FIGS. 1 to 6 show one preferred embodiment of the invention. A friction material-charging device 1 is adapted to charge an appropriate amount of a friction material 2 into an intermediate die member 8 receiving a lower die member 9 therein. The friction material 2 is formed by uniformly mixing or blending together a reinforcing material, friction modifiers, a binder, etc., using an agitator (not shown). The thus formed friction material 2 is contained in a can 3, and is transferred to the friction material-charging device 1.

Figure 6:
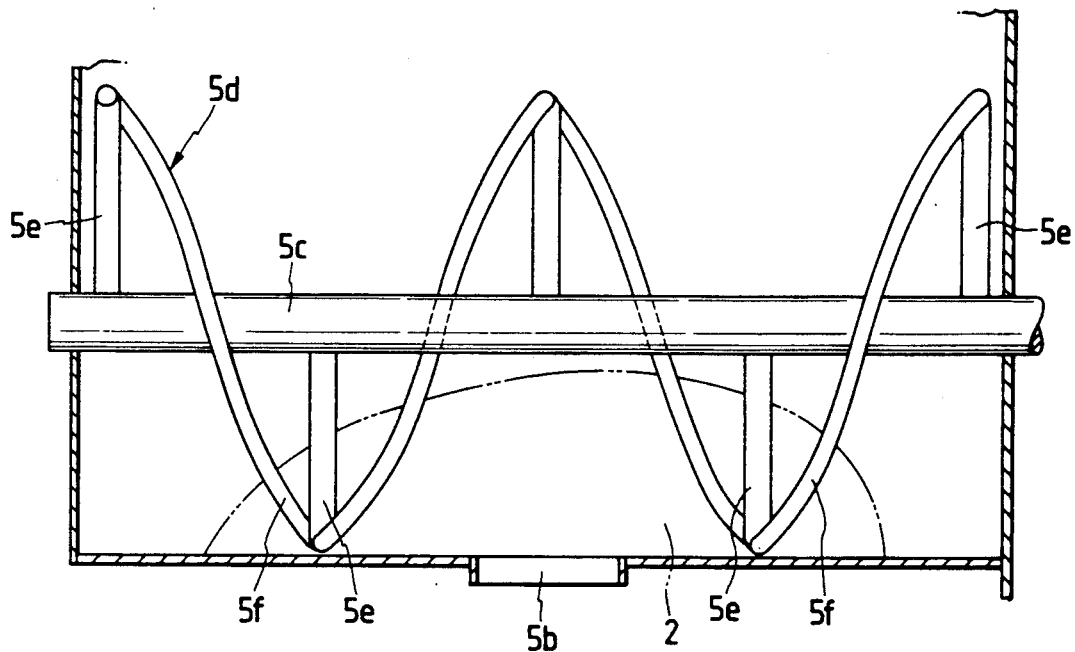
FIG. 6 is an enlarged front-elevational view of a screw feeder of a blender supply device.

A turn device 4 is mounted on the upper end of the friction material-charging device 1. The can 3 containing the friction material 2 is turned over by the turn device 4 about an axis O, so that the friction material 2 is charged from the can 3 into a container 5a of a blender supply device 5. The container 5a has a discharge port 5b formed through a central portion of the bottom thereof. A rotatable shaft 5c disposed horizontally is received in a lower portion of the container 5a, and a wire 5f is spirally wound around the rotatable shaft 5c. The rotatable shaft 5c and the spiral wire 5f jointly constitute a screw feeder 5d. As shown in FIG. 6, a plurality of posts 5e extend radially from the rotatable shaft 5c, and the spiral wire 5f is fixedly secured to the distal ends of the posts 5e. The wire 5f is oppositely spiral much like right-handed and left-hand screws on opposite sides of the central portion thereof. When the rotatable shaft 5c is rotated in one direction by a motor 5g, the friction material 2 in the container 5a is mixed and moved toward the central discharge port 5b.

The friction material 2 discharged from the discharge port 5b is transferred by a screw feeder 6 rotated by a motor 6a, and is fed to vibration feeders 7 via a pair of discharge port 6b. The screw feeder 6 is also oppositely spiral much like right-handed and left-hand screws on opposite sides of the central portion thereof, and feeds the friction material 2 to the vibration feeders 7 via the right and left discharge ports 6b (FIG. 1). At each of the subsequent stages, a pair of relevant devices are arranged in juxtaposed relation, and a pair of preformed products are produced at the same time. For the purpose of simplifying the description, the process of preforming one product (brake disc) will be described hereinafter.

Figure 2:
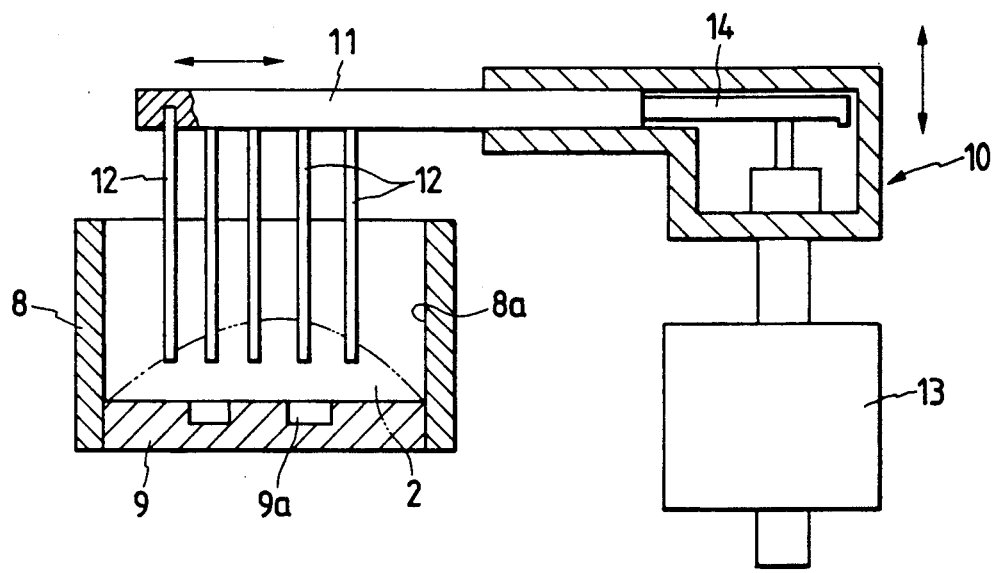
FIG. 2 is a cross-sectional view of a leveling device of the preforming apparatus.

The vibration feed 7 includes a trough 7b vibrated by a vibration source 7a whose vibration frequency is variable. The vibration source 7a applies vibrations of a predetermined frequency to the trough 7b for a predetermined time period, so that an appropriate amount of the friction material 2 metered is fed to the intermediate die member 8 placed on a transfer device 31 associated with a conveyer 31. As shown in FIG. 2, the intermediate die member 8 is of a tubular shape and has a cavity 8a corresponding in cross-section to the lower die member 9. The lower die member 9 is fitted in the lower end portion of the intermediate die member 8. Therefore, the friction material 2 fed from the trough 7b to the intermediate die member 8 is heaped up on the lower die member 9.

The intermediate die member 8 supplied with the friction material 2 is transferred by the conveyer 30, and sequentially passes past a leveling device 10, a recess-pressing device 15 and a pressing device 18.

As shown in FIG. 2, the leveling device 10 comprises a base 11 having a plurality of narrow bars 12 depending perpendicularly from the base 11, a first elevator mechanism 13 associated with the base 11, and a horizontal movement-imparting mechanism 14 associated with the base 11. The first elevator mechanism 13 serves to move the base 11 vertically, that is, upward and downward. When the base 11 is moved downward by the first elevator mechanism 13, the narrow bars 12 are inserted into the intermediate die member 8, so that the distal end portions of the narrow bars 12 are extended into the heaped-up friction material 2. The first elevator mechanism 13 is constituted by a rack-and-pinion mechanism, a reciprocal-type cylinder, etc. The horizontal movement-imparting mechanism 14 imparts a horizontal reciprocal movement to the base 11 when the base 11 is moved downward. The horizontal movement-imparting mechanism 14 is constituted by a cam mechanism, a reciprocal slider crank, etc.

Figure 3:
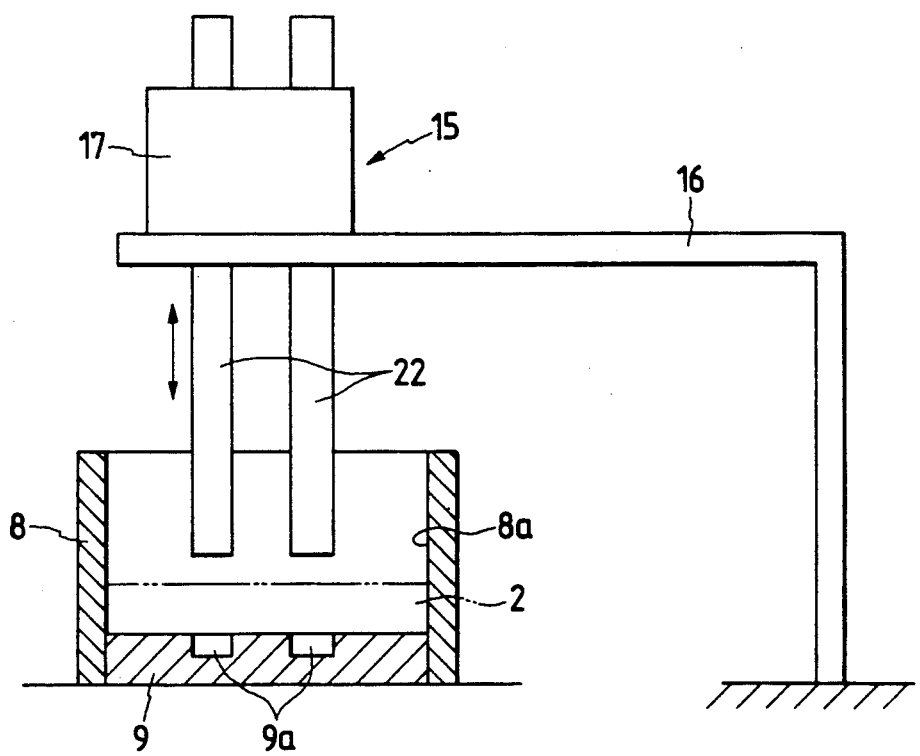
FIG. 3 is a cross-sectional view of a recess-pressing device of the preforming apparatus.

As shown in FIG. 3, the recess-pressing device 15 comprises a second elevator mechanism 17 which is supported by a support base 16 and moves a pair of push rods 22 upwardly and downwardly. When the push rods 22 are moved downward by the second elevator mechanism 17, the push rods 22 are inserted into the intermediate die member, so that the distal end portions of the push rods 22 are inserted respectively into a pair of recesses 9a in the lower die member 9, thereby pushing the friction material 2 into the pair of recesses 9a. The second elevator mechanism 17 is constituted by a rack-and-pinion mechanism, a reciprocal-type cylinder, etc. The pair of recesses 9a are provided for forming a pair of projections on the preformed friction material 2 for a disc brake. The pair of projections are fitted respectively in a pair of recesses in a backing plate, thereby increasing the strength of connection between the frictional material 2 and the backing plate.

Figure 4:
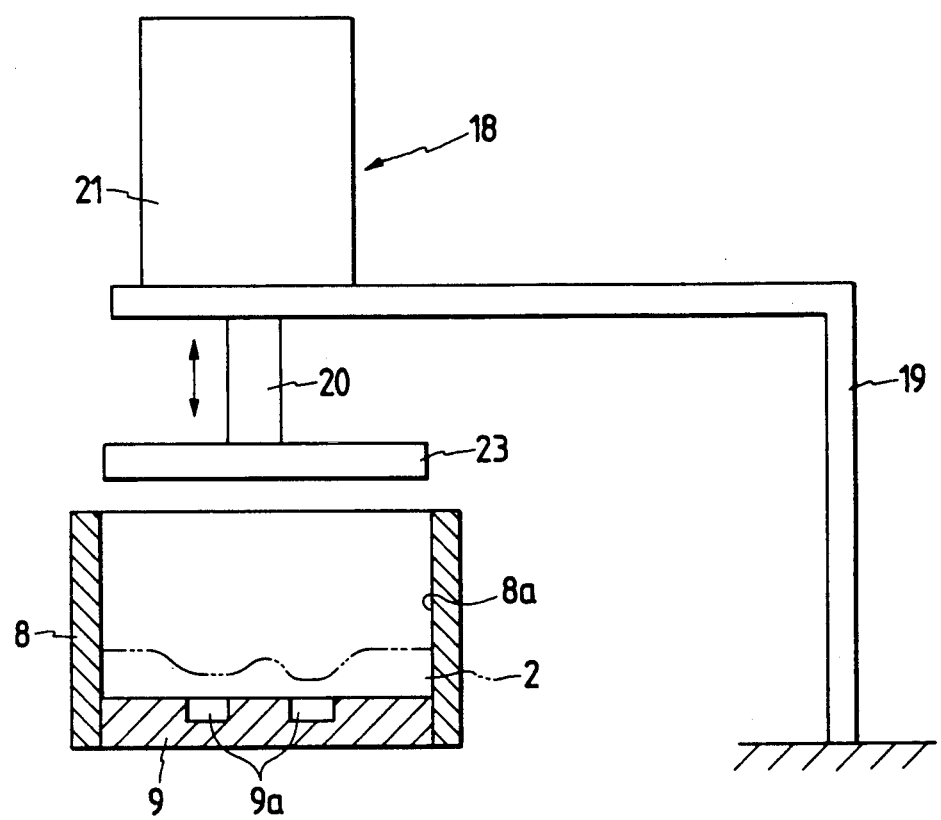
FIG. 4 is a cross-sectional view of a pressing device of the preforming apparatus.
Figure 5:
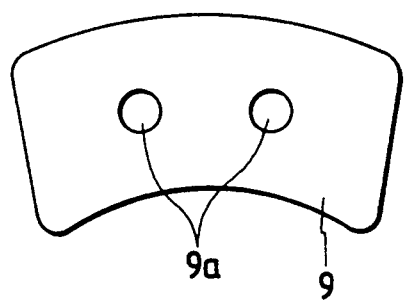
FIG. 5 is a plan view of a lower die member.

As shown in FIG. 4, the pressing device 18 comprises a third elevator mechanism 21 which is supported by a support base 19 and moves a support member 20 upwardly and downwardly. The support member 20 has an upper die member 23 fixedly mounted on the lower end of the support member 20, the upper die member 23 being in the form of a flat plate. When the support member 20 is moved downward by the third elevator mechanism 21, the upper die member 23 is fitted into the intermediate die member 8 so as to press the friction material 2 on the lower die 9. The third elevator mechanism 21 is constituted by a pressing machine or the like. Thus, a preforming die is constituted by the intermediate die member 8, the lower die member 9 and the upper die member 23.

The operation of the apparatus for preforming a friction material according to the invention will now be described.

The friction material 2 contained in the container 3 in the friction material-charging device 1 is sequentially fed via the blender supply device 5, the screw feeder 5d, the screw feeder 6 and the vibration feeder 7, and then an appropriate amount of the friction material 2 is charged into the cavity 8a of the intermediate die member 8 in a heaped-up manner.

The intermediate die member 8 thus supplied with the friction material 2 is transferred by the conveyer 30 together with the transfer device 31, and reaches a position beneath the leveling device 10. Then, the first elevator mechanism 13 is driven to move the base 11 downward, so that the plurality of narrow bars 12 are inserted into the cavity 8a of the intermediate die member 8, thereby causing the lower end portions of the narrow bars 12 to be extended into the heaped-up friction material 2. Then, the horizontal movement-imparting mechanism 14 is driven to impart a horizontal reciprocal movement to the base 11. As a result, the friction material 2 heaped up on the lower die member 9 is raked in right and left directions by the plurality of narrow bars 12, and therefore is generally leveled, that is, made generally flat. After this leveling operation is finished, the base 11 is returned or moved upward by the first elevator mechanism 13 to the position where the narrow bars 12 will not interfere with the intermediate die member 8.

The intermediate die member 8 is further transferred by the conveyer 30 to a position beneath the recess-pressing device 15. Then, the second elevator mechanism 17 is driven to move the pair of push rods 22 downward into the cavity 8a of the intermediate die member 8, so that the pair of push rods 22 are pushed into the pair of recesses 9a in the lower die member 9, respectively. As a result, part of the generally leveled-friction material 2 is pressed or forced into the pair of recesses 9a, and therefore each recess 9a is fully filled with the friction material, and the friction material in each recess 9a undergoes a suitable compressive force. After the friction material is pressed into the pair of recesses 9a, the push rods 22 are returned or moved upward by the second elevator mechanism 17 to the position where the push rods 22 will not interfere with the intermediate die member 8.

Then, the intermediate die member 8 is further transferred by the conveyer 30 to a position beneath the pressing device 18. Then, the third elevator mechanism 21 is driven to move the support member 20 downward, so that the upper die member 23 is fitted into the cavity 8a of the intermediate die member 8 and is moved downward. As a result, the friction material 2 within the intermediate die member 8 is pressed by the upper die member 23 and is preformed into a predetermined shape to provide the preformed friction material 2 for use in the disc brake.

Then, the lower die member 9 is pushed or ejected upward to remove the preformed friction material 2 from the intermediate die member 8. Then, the preformed friction material is transferred to the next stage, that is, a heat shaping step.

Figure 7:
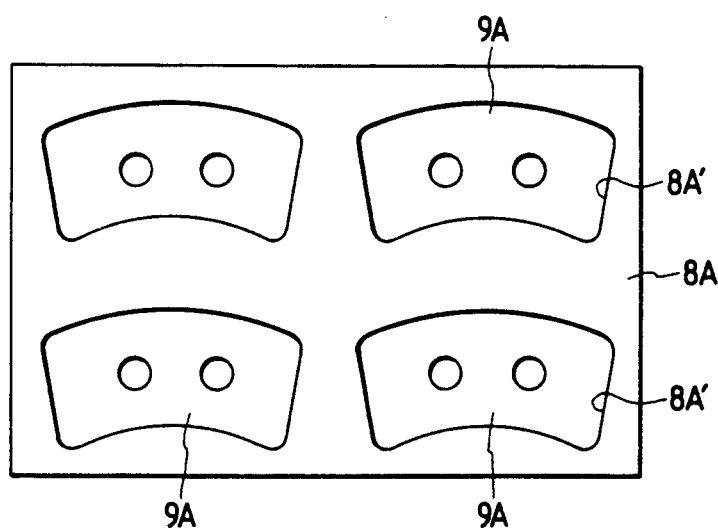
FIG. 7 is a plan view of a modified intermediate die member.

In the above embodiment, although the intermediate die member 8 has a tubular shape having the cavity 8a for receiving the lower die member 9, this intermediate die member 8A may be replaced by a modified intermediate die member (shown in FIG. 7) which comprises a body in the form of a block having a plurality of tubular cavities 8A' in which lower dies 9A are received, respectively. In this case, of course, the narrow bars 12 of the leveling device 10, the push rods 22 of the recess-pressing device 15 and the upper die 23 are provided for a respective one of the cavities 8A'. With the use of the intermediate die member 8A, a plurality of friction materials 2 can be produced at the same time.

As will be appreciated from the foregoing description, in the present invention, the preformed friction material can be automatically produced by the preforming apparatus, and the efficiency of the operation is greatly improved, without varying the quality of the preformed products. Further, since the operator does not need to directly touch the friction material containing harmful asbestos, the working environment is greatly improved.

What is claimed is:

1. An apparatus for preforming a friction material comprising:
    a preform die including a lower die member having recesses formed in an upper surface thereof, an intermediate die member having a cavity for receiving said lower die member therein, and an upper die member slidably engageable in said cavity in said intermediate die member;
    a friction material-charging device for charging an appropriate amount of friction material into said cavity in said intermediate die member receiving said lower die member therein;
    a leveling device including a base having a plurality of narrow bars depending from said base, a first elevator means for vertically moving said base, so that when said base is moved downward, said plurality of narrow bars are inserted into said cavity in said intermediate die member, and a device for imparting a horizontal reciprocal movement to said base when said base is moved downward, so as to level the friction material by said plurality of narrow bars;
    a recess-pressing device including a push rod and a second elevator means for vertically moving said push rod, so that when said push rod is moved downward, said push rod is inserted into said cavity in said intermediate die member pressing the friction material into said recesses; and
    a pressing device including a third elevator means for vertically moving said upper die member, so that when said upper die member is moved downward, said upper die member is inserted in said cavity in said intermediate die member pressing the friction material.

2. An apparatus for preforming a friction material according to claim 1, wherein said intermediate die member has a plurality of said cavities for receiving a plurality of said lower die members, respectively.

* * * * *

UNITED STATES PATENT AND TRADEMARK OFFICE
CERTIFICATE OF CORRECTION

PATENT NO. : 5,061,171
DATED : October 29, 1991
INVENTOR(S) : YOZO AKATSU

It is certified that error appears in the above-identified patent and that said Letters Patent is hereby corrected as shown below:

Title page , Title, change "PERFORMING" to --PREFORMING--.

Abstract, line 1, change "performing" to --preforming--.

Signed and Sealed this

Fourth Day of May, 1993

Attest:

MICHAEL K. KIRK

Attesting Officer

Acting Commissioner of Patents and Trademarks